(12) United States Patent
Barve et al.

(10) Patent No.: US 8,104,293 B2
(45) Date of Patent: Jan. 31, 2012

(54) MAGNETO-CALORIC COOLING DEVICE AND METHOD OF OPERATION

(75) Inventors: Jayesh Jayanarayan Barve, Bangalore (IN); Chandrasekhar Samiappan, Mumbai (IN); Sunil Srinivasa Murthy, Chennai (IN)

(73) Assignee: General Electric Company, Niskayuna, NY (US)

( * ) Notice: Subject to any disclaimer, the term of this patent is extended or adjusted under 35 U.S.C. 154(b) by 1260 days.

(21) Appl. No.: 11/764,819

(22) Filed: Jun. 19, 2007

(65) Prior Publication Data

US 2008/0314048 A1 Dec. 25, 2008

(51) Int. Cl.
*F25B 21/00* (2006.01)
(52) U.S. Cl. .......................................................... 62/3.1
(58) Field of Classification Search .................. 62/3.1, 62/324.2
See application file for complete search history.

(56) References Cited

U.S. PATENT DOCUMENTS

| | | | |
|---|---|---|---|
| 3,070,964 A | 1/1963 | Horvay | |
| 3,370,434 A | 2/1968 | Mole | |
| 5,249,424 A * | 10/1993 | DeGregoria et al. | 62/3.1 |
| 5,934,078 A * | 8/1999 | Lawton et al. | 62/3.1 |
| 6,467,274 B2 * | 10/2002 | Barclay et al. | 62/3.1 |
| 6,985,000 B2 * | 1/2006 | Feder et al. | 324/750.05 |
| 6,990,816 B1 | 1/2006 | Zuo et al. | |
| 2005/0120720 A1 * | 6/2005 | Fang et al. | 62/3.1 |
| 2005/0262870 A1 | 12/2005 | Narayanamurthy et al. | |

FOREIGN PATENT DOCUMENTS

WO 2007/027171 A1 3/2007

* cited by examiner

*Primary Examiner* — Frantz Jules
*Assistant Examiner* — Lukas Baldridge
(74) *Attorney, Agent, or Firm* — Richard D. Emery

(57) ABSTRACT

A method of operating a cooling device is provided. The method includes sequentially regulating a temperature of a plurality of thermally coupled magneto-caloric elements for maximizing a magneto-caloric effect for each of the magneto-caloric elements when subjected to a magnetic regenerative refrigeration cycle.

28 Claims, 7 Drawing Sheets

MAGNETO-CALORIC COOLING DEVICE AND METHOD OF OPERATION

BACKGROUND

Embodiments of the invention relates generally to cooling devices, and particularly to, cooling devices based on a magneto-caloric effect (MCE).

Cooling devices may be used for a variety of cooling systems, such as refrigeration, air conditioning, electronics cooling, automotives cooling and industrial temperature control. Typically, existing thermal transfer devices, such as those relying on vapor-cycle refrigeration cycles, are relatively inefficient and environmentally unfriendly due to mechanical components such as compressors and the use of refrigerants.

Magnetic refrigeration techniques based on the magneto-caloric effect may be used as an alternative to conventional vapor-cycle refrigeration. Typically, cooling devices based on the magneto-caloric effect include a magneto-caloric material that is subjected to a magnetic field. The magneto-caloric material functions as a refrigerant and starts in thermal equilibrium with an environment to be refrigerated and the environment where the extracted heat is dissipated. Near a transition temperature of the magneto-caloric material, adiabatic application of a magnetic field reduces the magnetic entropy significantly by ordering the magnetic moments. This results in an increase in the temperature of the magnetic material. The MCE is defined in terms of an adiabatic change in temperature or isothermal change in magnetic entropy. This phenomenon is reversible for most magneto-caloric materials. Thus, adiabatic removal of the field reverts the magnetic entropy back to its original state and cools the material accordingly.

In operation, the magneto-caloric material is coupled with a heat transfer fluid. On magnetization, the heat transfer fluid gains heat and transfers energy to a hot sink. Further, removal of the field reduces the temperature of the magneto-caloric material to a point lower than it was prior to magnetization. Thus, the material can cool a cold source coupled with the heat transfer fluid. During cold startup, a cooling device achieves a desired cold box temperature starting from an initial equilibrium temperature. Further, such devices are also required to tackle changes such as change in environment temperature, change in desired cold box temperature, change in cooling load etc. However, existing cooling devices based on the magneto-caloric effect take a long time to achieve the desired cold box temperature and are not scalable to tackle changes in the environmental temperature, desired cold box temperatures and cooling load changes.

Accordingly, it would be desirable to develop an efficient cooling device based on the magneto-caloric effect. Furthermore, it would be desirable to provide a cooling device that is able to achieve fast, efficient and robust cold start-up and is scalable to tackle changes in the environmental temperature, desired cold box temperatures and cooling load changes.

BRIEF DESCRIPTION

Briefly, according to one embodiment of the invention, a method of operating a cooling device is provided. The method includes sequentially regulating a temperature of a plurality of thermally coupled magneto-caloric elements for maximizing a magneto-caloric effect for each of the magneto-caloric elements when subjected to a magnetic regenerative refrigeration cycle.

In another embodiment, a method of operating a cooling device is provided. The method includes sequentially regulating a temperature of a plurality of thermally coupled magneto-caloric elements to be substantially equal to an activation temperature of the respective magneto-caloric element for maximizing a magneto-caloric effect for each of the magneto-caloric elements when subjected to a magnetic regenerative refrigeration cycle. The method also includes maintaining the temperature of each of the plurality of magneto-caloric elements at the temperature substantially equal to the activation temperature of the respective magneto-caloric element to facilitate cooling of an environment.

In another embodiment, a cooling device is provided. The cooling device includes a plurality of thermally coupled magneto-caloric elements subjected to a magnetic regenerative refrigeration cycle and configured to provide cooling of an environment and a control system configured to control a temperature of the plurality of magneto-caloric elements to be substantially equal to an activation temperature of each respective magneto-caloric element.

In another embodiment, a system is provided. The system includes at least one cooling device having a plurality of magneto-caloric elements subjected to a magnetic regenerative refrigeration cycle and configured to provide cooling of an environment, a magnet configured to magnetize or demagnetize the plurality of magneto-caloric elements and a control system configured to control a temperature of the plurality of magneto-caloric elements to be substantially equal to an activation temperature of each respective magneto-caloric element.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention function to provide a cooling device based on a magneto-caloric effect (MCE). In particular, embodiments of the present invention provide a technique that facilitates a robust, fast and efficient cold start-up of the cooling device based on the magneto-caloric effect. As used herein, the term "magneto-caloric effect" refers to a magneto-thermodynamic phenomenon in which a reversible change in temperature of a magnetic material is caused by exposing the material to a changing magnetic field. The MCE results in an adiabatic rise in temperature of the magnetic material when subjected to a magnetic field and an adiabatic fall in the temperature of the magnetic material upon removal of the magnetic field. In certain embodiments, the MCE is measured in terms of an adiabatic change in temperature or an isothermal change in magnetic entropy of the magnetic material.

Figure 1:
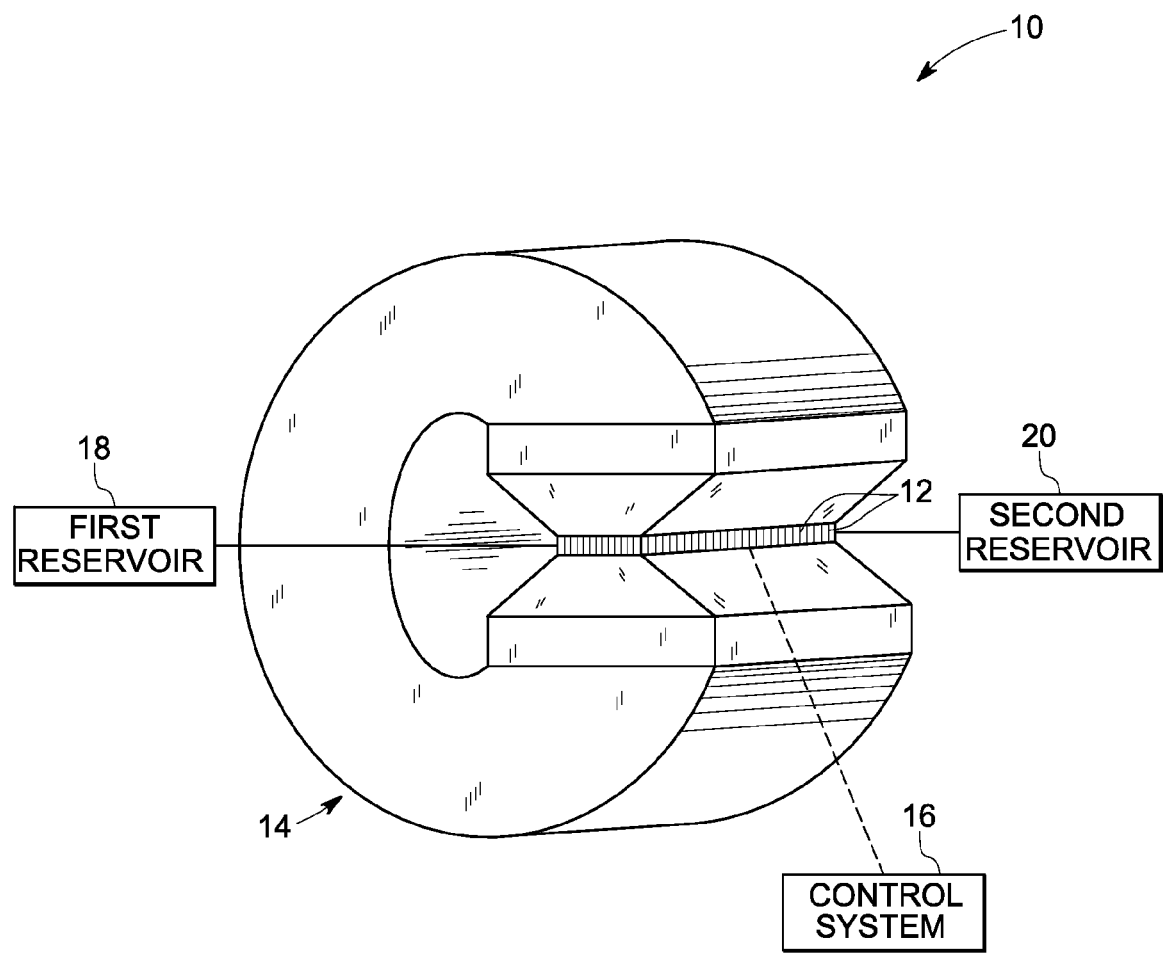
FIG. 1 illustrates an exemplary cooling device based on a magneto-caloric effect.

Referring now to the drawings, FIG. 1 illustrates an exemplary cooling device 10 that is configured to provide cooling of an environment using the magneto-caloric effect The cooling device 10 includes a plurality of thermally coupled magneto-caloric elements such as represented by reference numeral 12 and a magnet 14 configured to magnetize or demagnetize the plurality of magneto-caloric elements 12. Further, the cooling device 10 includes a control system 16 coupled to the plurality of magneto-caloric elements 12 to control a temperature of the plurality of magneto-caloric elements 12 to be substantially equal to an activation temperature of each respective magneto-caloric element 12. As used herein, the term "activation temperature" refers to a temperature or a range of temperatures of the magneto-caloric element 12 at which the magneto-caloric element 12 exhibits a significant MCE to facilitate the cooling of the environment. For example, the activation temperature range may be an operational temperature range in which the magneto-caloric element 12 demonstrates a MCE temperature change of about 40% or more of a peak MCE temperature change for the same element 12 at the same operating flux density.

The activation temperature of the magneto-caloric elements 12 may be estimated based upon factors such as a Curie temperature of a respective magneto-caloric element 12, a MCE curve of the respective magneto-caloric element 12, intensity of an applied magnetic field through the magnet 14 and so forth. As used herein, the term "Curie temperature" refers to a ferromagnetic Curie temperature at which a ferromagnetic substance loses its magnetization at a substantially high rate due to thermal agitation, and thereby shows large change in isothermal entropy change at this temperature. The details of the MCE curve for the magneto-caloric element 12 will be described in detail below with reference to FIG. 5.

In operation, the control system 16 is configured to sequentially regulate the temperature of the plurality of magneto-caloric elements 12 for maximizing the MCE for each of the plurality of magneto-caloric elements 12 when subjected to a magnetic regenerative refrigeration cycle. An exemplary magnetic regenerative refrigeration cycle applied to the plurality of magneto-caloric elements 12 will be described in detail below with reference to FIG. 2. In particular, the plurality of magneto-caloric elements may be heated or cooled through isentropic magnetization, or isentropic demagnetization and through transfer of heat using a fluid medium. In this embodiment, the cooling device 10 includes first and second reservoirs 18 and 20 thermally coupled to the magneto-caloric elements 12. The first and second reservoirs 18 and 20 include the fluid medium for transferring the heat between the magneto-caloric elements 12 and the environment. Further, the control system 16 is configured to control a plurality of valves (not shown) for selectively heating or cooling of the magneto-caloric elements 12 through the fluid medium from the first and second reservoirs 18 and 20 based upon a measured temperature of the plurality of magneto-caloric elements 12. The sequential regulation of temperatures of the magneto-caloric elements 12 through the control system 16 will be described in detail below with reference to FIG. 4.

Figure 2:
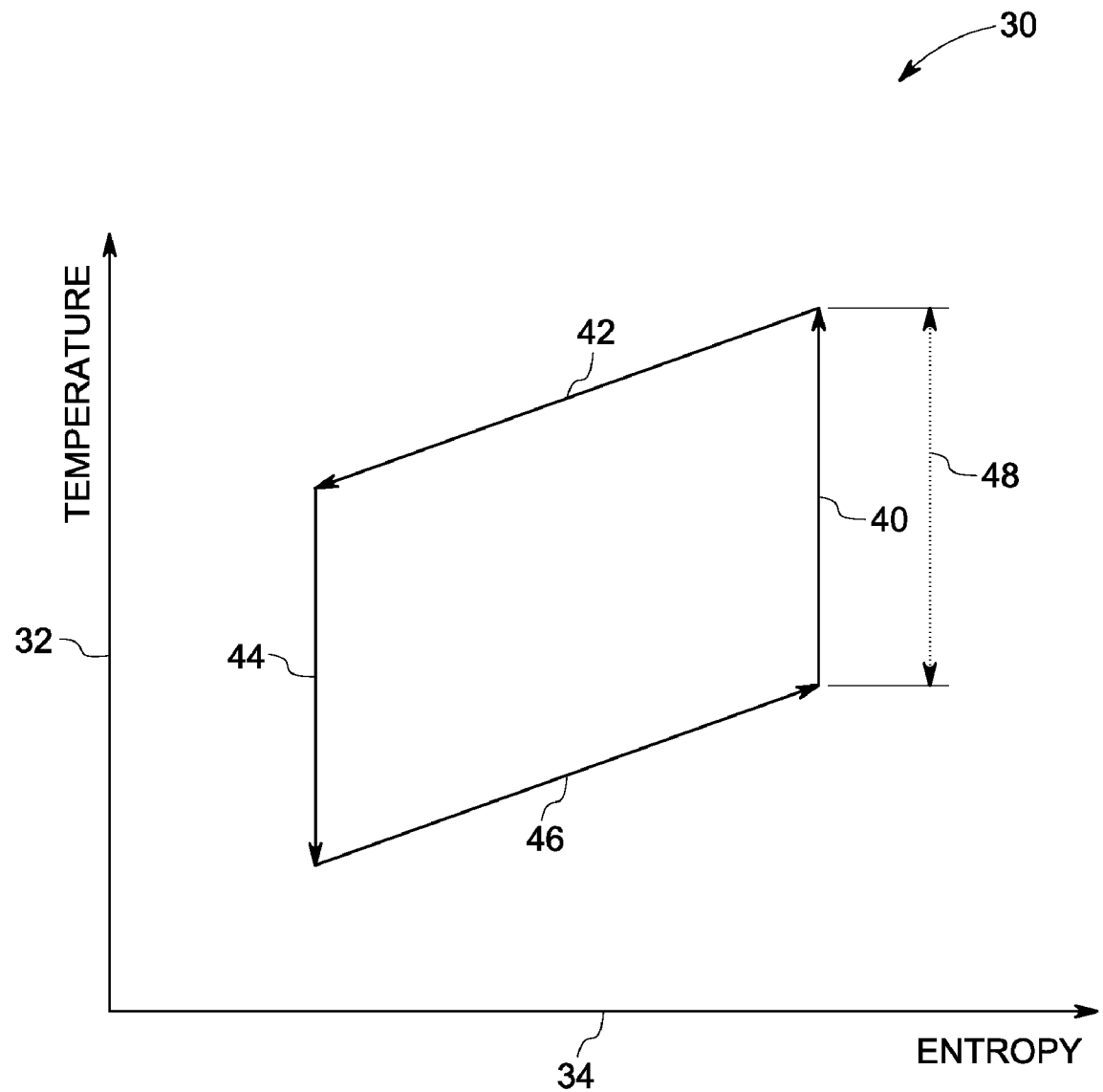
FIG. 2 is a graphical representation of an exemplary magnetic regenerative refrigeration cycle applied to a single magneto-caloric element of the cooling device of FIG. 1.

FIG. 2 is a graphical representation of an exemplary magnetic regenerative refrigeration cycle 30 applied to a single MCE element such as represented by reference numeral 12 of FIG. 1. The ordinate axis represents a temperature 32 of the magneto-caloric element 12 and the abscissa axis represents magnetic entropy 34 of the magneto-caloric element 12. In operation, the magneto-caloric elements 12 are subjected to isentropic magnetization as represented by profile 40. In one exemplary embodiment, the application of the external magnetic field causes the magnetic dipoles of the atoms of the magneto-caloric elements 12 to align thereby decreasing the material's magnetic entropy 34 and heating the magneto-caloric elements 12. Next, the added heat is removed using a fluid medium in an isofield heat transfer mode, as represented by profile 42. The magnetic field is maintained at a constant level to substantially prevent the dipoles from reabsorbing the heat. Once sufficiently cooled, the magneto-caloric elements and the fluid medium are separated.

As represented by profile 44, the magneto-caloric elements 12 are then subjected to isentropic demagnetization where the magnetic field is decreased thereby cooling the magneto-caloric elements 12. Further, as represented by profile 46, during isofield heat transfer the magnetic field is held constant at zero or at a pre-defined value to prevent the magneto-caloric elements 12 from heating back up and the magneto-caloric elements 12 are placed in thermal contact with the environment being refrigerated to facilitate the cooling of the environment. The MCE achieved (measured in terms of isentropic temperature change) for the magneto-caloric elements 12 subjected to the magnetic regenerative refrigeration cycle 30 is represented by reference numeral 48.

Figure 3:
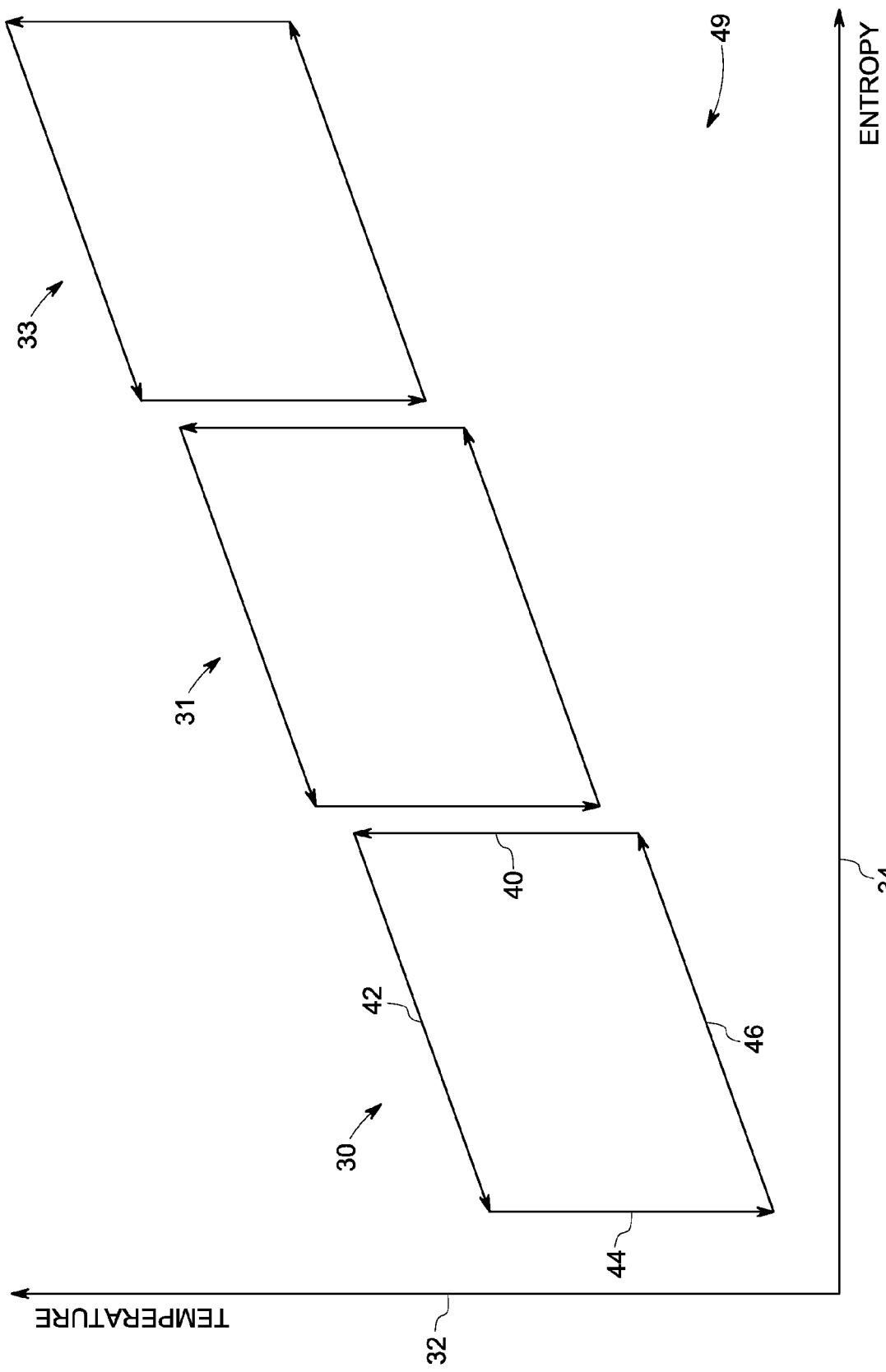
FIG. 3 is a graphical representation of an exemplary magnetic regenerative refrigeration cycle applied to the plurality of MCE elements of FIG. 1.

In accordance with one embodiment of the present invention, each of the magneto-caloric elements 12 is subjected to the magnetic regenerative refrigeration cycle 30 described above. FIG. 3 a graphical representation of an exemplary magnetic regenerative refrigeration cycle 49 applied to the plurality of MCE elements 12 of FIG. 1. In this embodiment, the magnetic regenerative cycle 49 is applied to three MCE elements 12. As illustrated, each of the plurality of MCE elements 12 is subjected to individual magnetic regenerative refrigeration cycles such as represented by reference numerals 30, 31 and 33. As described above, each of the magnetic regenerative refrigeration cycle 30, 31 and 33 include the steps of heating the MCE elements 12 by isentropic magnetization 40, removing the heat using the fluid medium during isofield heat transfer mode 42, cooling the MCE elements by isentropic demagnetization 44 and cooling the environment during isofield heat transfer mode 46. Further, in one embodiment, the temperature of the plurality of magneto-caloric elements 12 are regulated in a sequential manner for maximizing the MCE 48 for each of the magneto-caloric elements 12. The sequential regulation of the temperature of the magneto-caloric elements 12 will be described in detail below with reference to FIG. 4.

Figure 4:
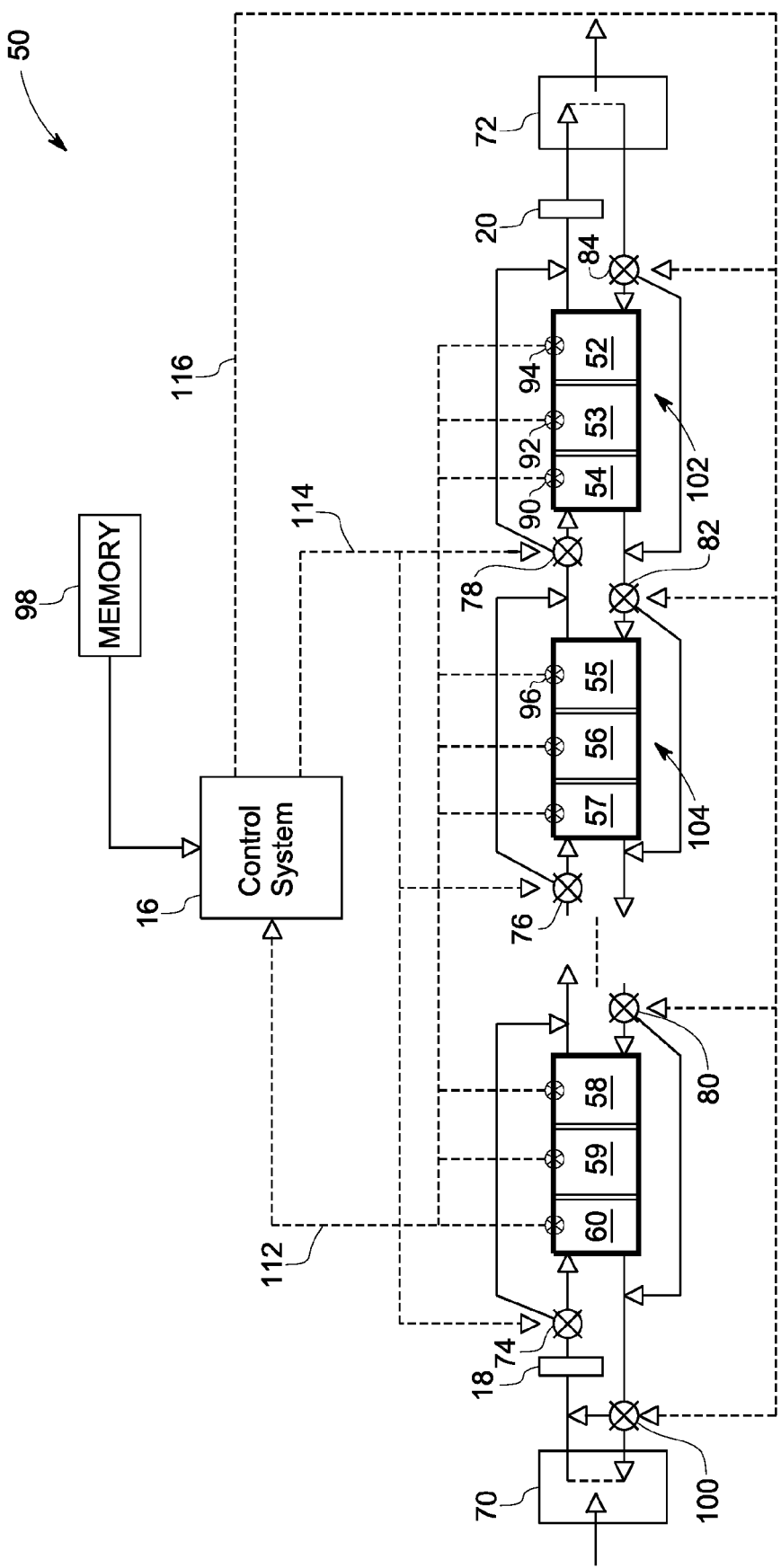
FIG. 4 illustrates an exemplary configuration of the cooling device of FIG. 1.

FIG. 4 illustrates an exemplary configuration 50 of the cooling device 10 of FIG. 1. As illustrated, the cooling device 50 includes a plurality of thermally coupled magneto-caloric elements such as represented by reference numerals 52-60 that are configured to provide cooling of a variety of environments. Examples of such environments include a refrigeration system, a chiller, a gas liquefaction plant, a cryocooler, a magnetic bearing device, an electronic device, an automotive, an air conditioning system and a rotating machine. In one embodiment, the magneto-caloric elements 52-60 may comprise materials including, but not limited to, gadolinium alloys, lanthanum alloys, manganese alloys, samarium alloys, cobalt alloys, tin alloys, and combinations thereof.

In this embodiment, the cooling device 50 includes the control system 16 that is configured to sequentially regulate the temperature of each of the plurality of magneto-caloric elements 52-60 to be substantially equal to the activation temperature of the respective magneto-caloric element 12 during a start-up mode of operation of the cooling device. As described above with reference to FIG. 1, the plurality of magneto-caloric elements 52-60 may be heated or cooled through isentropic magnetization, or isentropic demagnetization and through transfer of heat using a fluid medium for sequentially regulating the temperature of each of the plurality of magneto-caloric elements 52-60. In this exemplary embodiment, the cooling device 50 includes the first and second reservoirs 18 and 20 containing the fluid medium for transferring the heat between the magneto-caloric elements 52-60 and the environment. Examples of fluid medium suitable for use in the first and second reservoirs 18 and 20 include ethylene glycol, water, propylene glycol, helium, nitrogen and dynalene.

Further, the cooling device 50 also includes first and second heat exchangers 70 and 72 thermally coupled to the magneto-caloric elements 52-60 and to the first and second reservoirs 18 and 20 for transferring heat between the magneto-caloric elements 52-60 and the environment through the fluid medium. In the illustrated embodiment, the control system 16 is configured to control operation of a plurality of bypass valves such as represented by 74, 76, 78, 80, 82 and 84 for selectively heating or cooling the plurality of magneto-caloric elements 52-60 based upon an estimated activation temperature and a measured or an estimated temperature of the plurality of magneto-caloric elements 52-60.

In this exemplary embodiment, the cooling device 50 includes a plurality of temperature sensors for measuring temperature of at least one of the magneto-caloric elements 52-60. For example, the cooling device 50 includes a plurality of temperature sensors such as represented by reference numerals 90, 92, 94 and 96 for measuring the temperature of at least one of the magneto-caloric elements 52-60. Further, the control system 16 is configured to estimate the activation temperature of each of the plurality of magneto-caloric elements 52-60 based upon factors such as a Curie temperature of a respective magneto-caloric element 52-60, a MCE curve of the respective magneto-caloric element 52-60, intensity of an applied magnetic field through the magnet 14 (see FIG. 1) and so forth. In the illustrated embodiment, the cooling device 50 includes a memory 98 to store Curie temperatures, or MCE curves, or combinations thereof for each of the magneto-caloric elements 52-60 for estimation of the activation temperature of each of the magneto-caloric elements 52-60. In certain embodiments, the cooling device 50 includes a bypass valve 100 for bypassing a cooling load such as a freezer load during a start-up mode of operation or as desired during the operation of the cooling device 50. In one exemplary embodiment, the bypass valve is operated when the fluid temperature is higher than a bypass activation temperature. In one exemplary embodiment, the bypass activation temperature is equal to a desired cold box temperature. In another embodiment, the bypass activation temperature is a multiple of the desired cold environment temperature.

In the illustrated embodiment, the plurality of magneto-caloric elements 52-60 may be grouped in a plurality of magneto-caloric blocks to facilitate the sequential regulation of temperature of the plurality of magneto-caloric elements 52-60. Each of the plurality of magneto-caloric blocks may include a logical grouping of magneto-caloric elements 52-60 based upon the temperature of each of the plurality of magneto-caloric elements 52-60. For example, the number of the magneto-caloric elements in each of the magneto-caloric blocks may be determined based upon factors such as the isentropic MCE temperature change of different MCE elements 52-60, difference in Curie temperatures of the MCE elements 52-60, number of sensors employed for temperature sensing and so forth. In one embodiment, the control system 16 is configured to select a first magneto-caloric block 102 having one or more magneto-caloric elements such as represented by reference numerals 52-54. In this exemplary embodiment, at least one of the magneto-caloric elements 52, 54 and 56 has a temperature substantially equal to the activation temperature of the respective magneto-caloric element 52-54. Further, the control system 16 is configured to select a second magneto-caloric block 104 having one or more magneto-caloric elements such as represented by reference numeral 55-57. In the illustrated embodiment, the first and second magneto-caloric blocks 102 and 104 include three magneto-caloric elements each. However, a greater or lesser number of magneto-caloric elements may be envisaged. Moreover, the first and second magneto-caloric blocks 102 and 104 may include a different number of magneto-caloric elements.

In this embodiment, the magneto-caloric elements 52-54 in the first magneto-caloric block 102 are subjected to the magnetic regenerative refrigeration cycle 30 (see FIG. 2) to regulate the temperature of magneto-caloric elements 55-57 in the second magneto-caloric block 104 to be substantially equal to the activation temperature for each respective magneto-caloric element 55-57. Further, the process of selecting the first and second magneto-caloric blocks 102 and 104 and subjecting the first magneto-caloric block 102 to the magnetic regenerative refrigeration cycle 30 is sequentially repeated for regulating the temperatures of the magneto-caloric elements 52-60 to be substantially equal to the activation temperature for each respective magneto-caloric element 52-60. More particularly, once the temperature of the magneto-caloric elements 55-57 in the second magneto-caloric block 104 is substantially equal to the activation temperature of each respective magneto-caloric element, the second magneto-caloric block 104 may be subjected to the magnetic regenerative refrigeration cycle to regulate the temperature of the magneto-caloric elements in the next sequential block. This process may be sequentially repeated such that the temperatures of the magneto-caloric elements 52-60 approach their respective activation temperatures.

As described above, the magneto-caloric elements 52-54 in the first magneto-caloric block 102 are subjected to magnetic regenerative refrigeration cycle 30. In particular, the magneto-caloric elements 52-54 are isentropically magnetized causing an increase in temperature of the magneto-caloric elements 52-54. The fluid medium flow through the magneto-caloric elements 52-54 from the first reservoir 18 toward the second reservoir 20 absorbs the heat from the magneto-caloric elements 52-54 and transfers the heat to a heat sink (not shown) through the heat exchanger 72. Further, the magneto-caloric elements 52-54 are isentropically demagnetized causing the temperature of the magneto-caloric elements 52-54 to decrease. Further, the fluid medium that flows through the magneto-caloric elements 52-54 from the second reservoir 20 toward the first reservoir 18 is cooled by the magneto-caloric elements 52-54 and may be used to absorb heat from subsequent magneto-caloric elements such as 55-57 and to absorb a heat load at the cold side through the heat exchanger 70.

In this exemplary embodiment, the plurality of bypass valves 74, 76, 78, 80, 82 and 84 may be operated to control the fluid medium flows from the first and second reservoirs 18 and 20 through the plurality of magneto-caloric elements 52-60 depending upon which blocks need to be heated or cooled such that temperatures of the plurality of magneto-caloric elements 52-60 approach their respective activation temperatures During the start-up mode of operation, the magneto-caloric elements 52, 54 and 56 in the first magneto-caloric block 102 may be subjected to the magnetic regenerative refrigeration cycle 30 as described above. Further, the temperature of at least one of the magneto-caloric elements 55-57 in the second block 104 may be measured and compared with the activation temperature of the respective magneto-caloric element 55-57. In one embodiment, the temperature of each of the magneto-caloric elements 55-57 is measured and is compared to the activation temperature of the respective magneto-caloric element 55-57. Further, the bypass valves 74, 76, 78, 80, 82 and 84 are operated to control the fluid flow from the first and second reservoirs 18 and 20 to achieve the heating or cooling of each of the magneto-caloric elements 55-57 in the second block 104 for regulating the temperature of the magneto-caloric elements 55-57 in the second block 104 substantially equal to the activation temperature of the respective element 55-57. Once the magneto-caloric element 55-57 reach their respective predefined activation temperatures, the first and second magneto-caloric blocks 102 and 104 together act as the system with a third block being the load, and all the remaining MCE elements and a cold source are still bypassed.

Alternately, the temperature of at least one magneto-caloric element in the second block 104 may be measured and the temperatures of remaining magneto-caloric elements in the second block 104 estimated based upon the measured temperature of the at least one element. The measured and the estimated temperatures of the magneto-caloric elements 55-57 in the second block 104 may be compared with the activation temperature of the respective magneto-caloric element 55-57. Further, the bypass valves 74, 76, 78, 80, 82 and 84 are operated to control the fluid flow from the first and second reservoirs 18 and 20 to achieve the heating or cooling of at least one of the magneto-caloric elements 55-57 in the second block 104.

Figure 5:
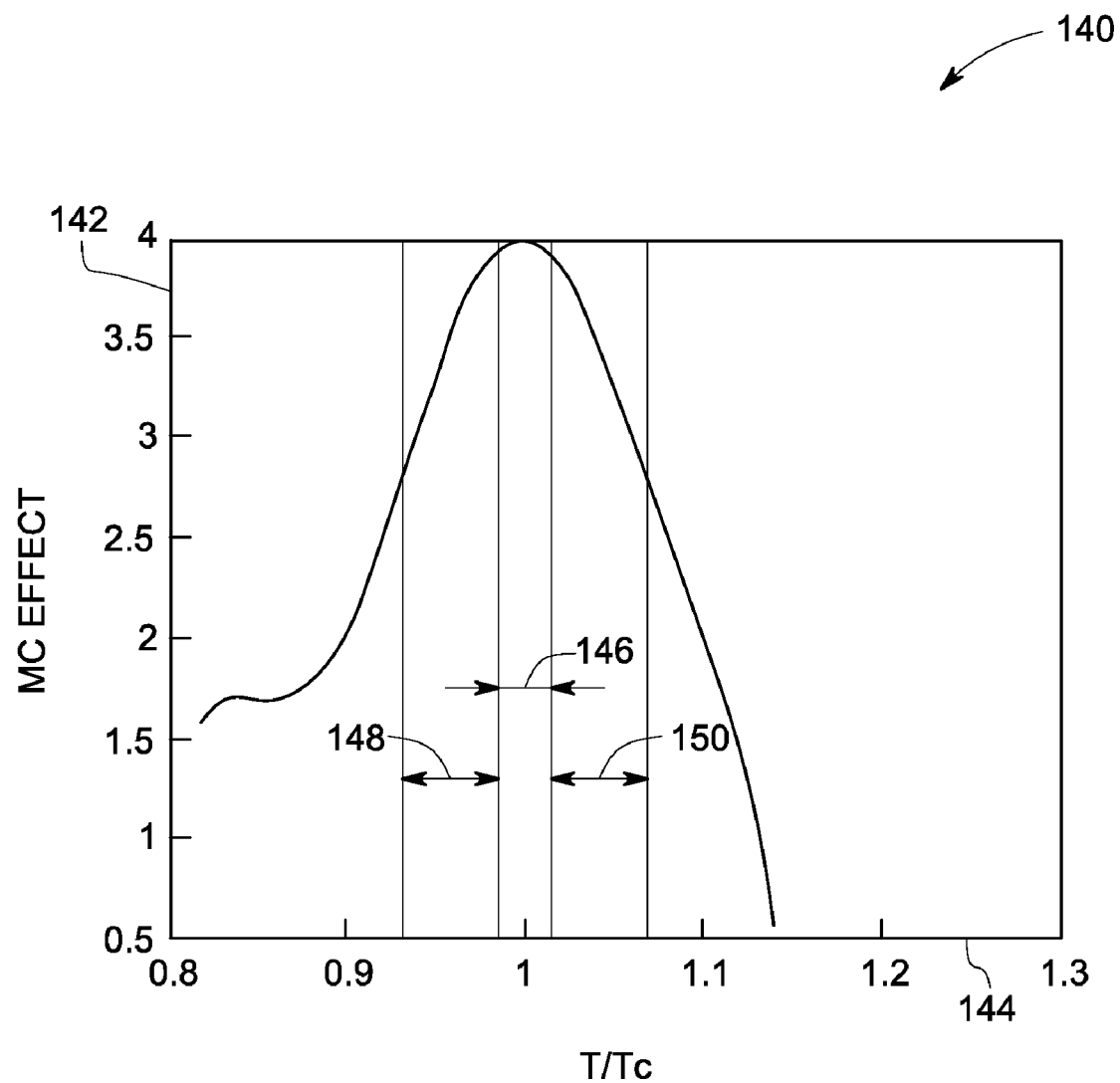
FIG. 5 illustrates an exemplary MCE curve of an exemplary magneto-caloric element employed in the cooling device of FIG. 4.

In one embodiment, the selective heating or cooling of the magneto-caloric elements 55-57 is achieved based upon the MCE curve of each of the elements 55-57 in the second block 104. FIG. 5 illustrates an exemplary MCE curve 140 of the magneto-caloric element such as represented by reference numeral 55 in the second magneto-caloric block 104 of cooling device 50 of FIG. 4. The ordinate axis represents the MCE measured as a change in temperature (Kelvin) 142 and the abscissa axis represents a ratio of measured temperature (T) of the magneto-caloric element 58 to a Curie temperature (Tc) 144 of the respective magneto-caloric element 58. In one embodiment, the magneto-caloric element 55 is operated in a region of operation represented by reference numeral 146 where the temperature of the magneto-caloric element 55 is substantially equal to its activation temperature. In the illustrated embodiment, when the temperature of the magneto-caloric element 55 is less than its activation temperature then the magneto-caloric element 55 is operated in a zone 148 where the magneto-caloric element 55 is heated using the fluid medium from the second reservoir 20 and the flow of the fluid medium from the first reservoir 18 is bypassed using the bypass valve 102. Alternately, when the temperature of the magneto-caloric element 55 is greater than its activation temperature then the magneto-caloric element 55 is operated in a zone 150 where the magneto-caloric element 55 is cooled using the fluid medium from the first reservoir 18 and the flow of the fluid medium from the second reservoir 20 is bypassed using the bypass valve 108. Similarly, other magneto-caloric elements 56 and 57 may be selectively cooled or heated based upon their measured and activation temperatures Referring back to FIG. 4, the control system 16 is configured to receive measured temperatures from the temperature sensors 90, 92, 94 and 96, as represented by reference numeral 112. Further, the control system 16 is configured to estimate the activation temperature of each of the plurality of magneto-caloric elements 52-60. In certain embodiments, the control system 16 may include a processor (not shown) to process the temperature measurements 112 from the temperature sensors 90, 92, 94 and 96 and to compare the temperature measurements 110 with the activation temperature of the respective magneto-caloric elements to generate flow switching valve commands 114 and 116 to the plurality of bypass valves 74, 76, 78, 80, 82 and 84.

It should be noted that the present invention is not limited to any particular processor for performing the processing tasks described herein. The term "processor," as that term is used herein, is intended to denote any machine capable of performing the calculations, computations, or generating signals necessary to perform the tasks of the invention. The term "processor" is intended to denote any machine that is capable of accepting a structured input and processing the input in accordance with prescribed rules to produce an output. It should also be noted that the phrase "configured to" as used herein means that the processor is equipped with a combination of hardware and software for performing the tasks described herein.

As described above, the control system 16 is configured to sequentially regulate temperatures of the plurality of magneto-caloric elements 52-60 substantially equal to the activation temperature of the respective element 52-60 thereby facilitating an efficient cold start-up of the cooling device 50. Further, the control system 16 is configured to maintain the temperature of the plurality of magneto-caloric elements 52-60 substantially equal to the activation temperature of the respective element 52-60 during a steady-state mode of operation of the cooling device 50. The following simulation example illustrates the sequential regulation of temperatures of the plurality of magneto-caloric elements through the control system 16.

EXAMPLE 1

In an exemplary cooling device, the hot sink temperature is about 308 K and a desired cold source temperature is about 250 K. The cooling device includes 31 magneto-caloric blocks and each block includes a single MCE element. In this embodiment, spacing between Curie temperatures of two consecutive MCE elements is set uniformly as about 2 K. Further, the activation temperature range is considered within 70% of the maximum MCE of the element. Initially, all the MCE elements and the cold source are considered to be in thermal equilibrium with the hot sink temperature that is similar to a cold startup case. In this exemplary embodiment, the MCE element with the highest Curie temperature acts as a system with the next MCE element acting as the load to be cooled while all other elements and freezer load being bypassed by the respective bypass valves. Once the second MCE element reaches its predefined activation temperature, the first and second MCE elements together act as the system with the third element being the load, and all the remaining MCE elements and a cold source are still bypassed. The process is repeated until all the MCE elements of the cooling device reach their respective activation temperatures. This is referred to as the Cold startup of the cooling device. The simulation results for the fluid exit temperature and the temperature of the cold source are shown below in FIGS. 6 and 7.

Figure 6:
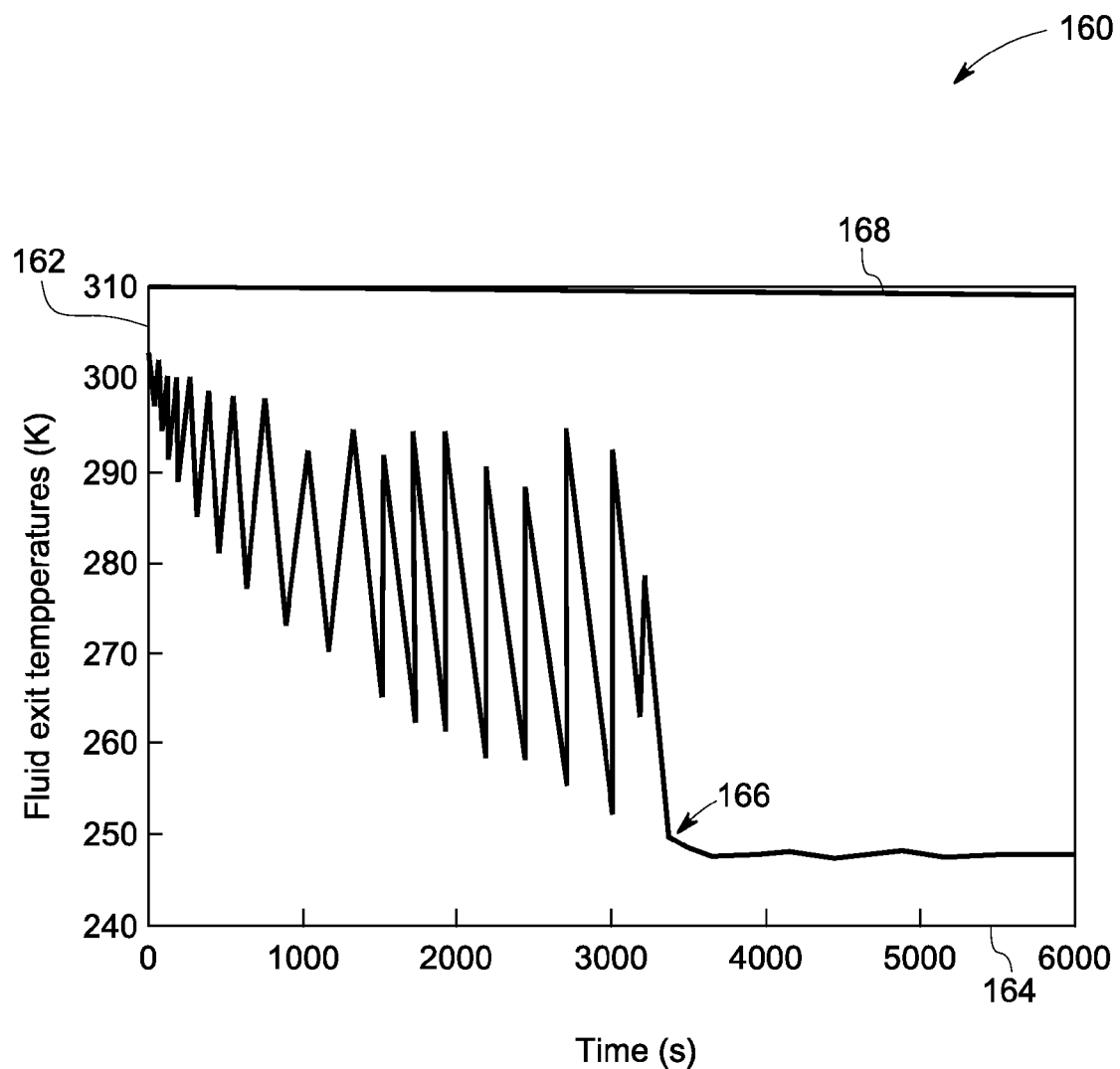
FIG. 6 illustrates exemplary simulation results for fluid exit temperatures for a cold start-up operation of the cooling device of FIG. 4.

FIG. 6 illustrates exemplary simulation results 160 for fluid exit temperatures for a cold start-up operation of the cooling device 50 of FIG. 4. The ordinate axis represents fluid exit temperatures 162 measured in Kelvin and the abscissa axis represents time 164 measured in seconds. The temperatures of the magneto-caloric elements of the cooling device 50 are regulated in a sequential manner as described above to enable an efficient cold start-up of the cooling device 50. As illustrated, the fluid exit temperature 166 decreased to about 250 K after all the magneto-caloric elements sequentially attained their activation temperatures from an ambient temperature 168. Advantageously, the sequential regulation of the temperatures of the magneto-caloric elements described above facilitates a robust and fast start-up of the cooling device 50. In one exemplary embodiment, an external freezer load may be introduced in the cooling device by closing the bypass valve 100 (see FIG. 4).

Figure 7:
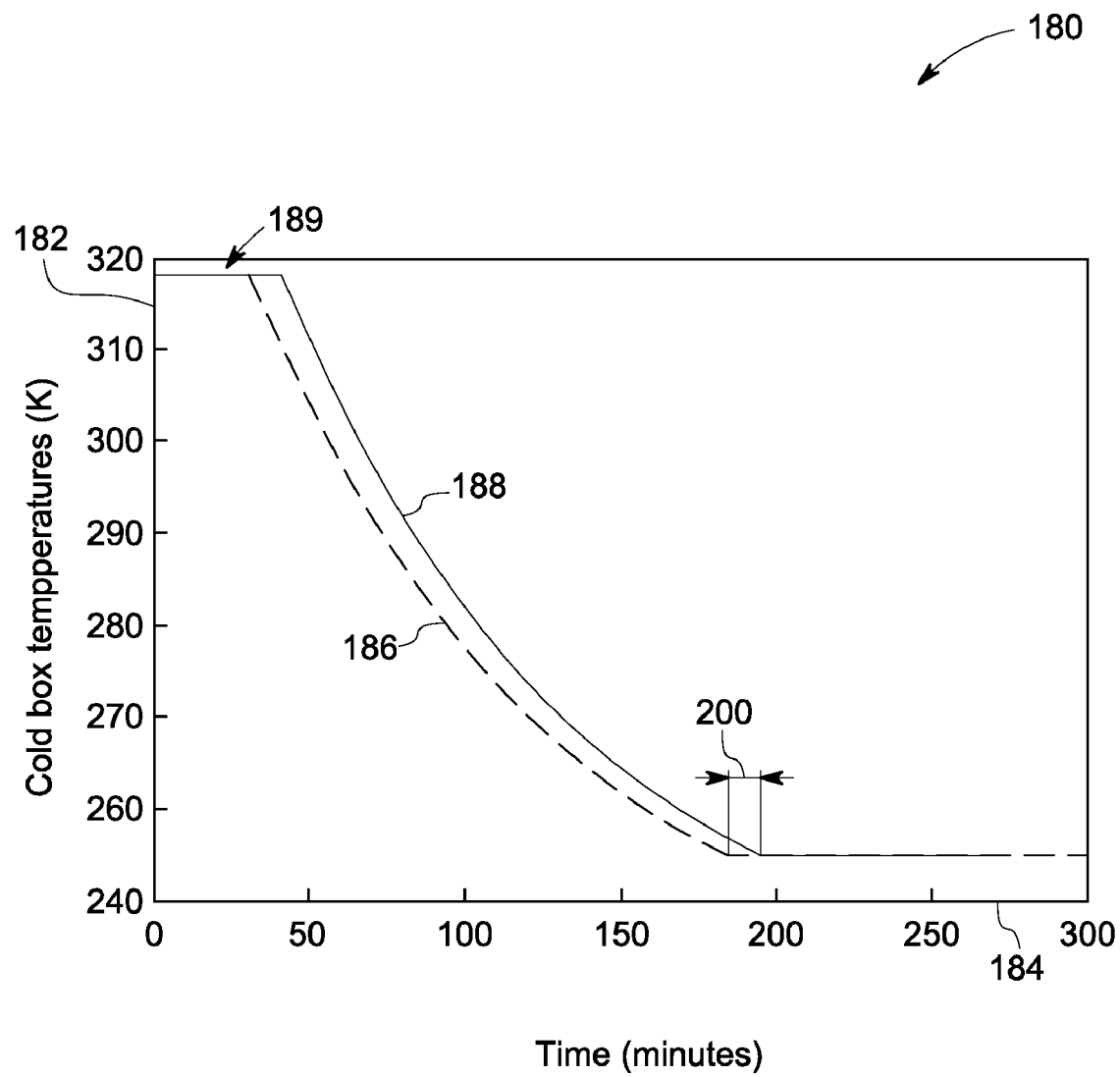
FIG. 7 illustrates exemplary simulation results for temperatures of a cold box such as a freezer compartment of the cooling device of FIG. 4.

FIG. 7 illustrates exemplary simulation results 180 for temperatures of a cold box such as a freezer compartment of the cooling device 50 of FIG. 4. The ordinate axis represents cold box temperatures 182 measured in Kelvin and the abscissa axis represents the time 184 measured in seconds. In the illustrated embodiment, profile 186 represents simulation results for the cold start-up operation with sequential regulation and control of the temperature of the magneto-caloric elements of the cooling device 50 as described above. Further, profile 188 represents simulation results for the cold start-up operation without sequential regulation and control of the temperature of the magneto-caloric elements of the cooling device 50. In this exemplary embodiment, the initial constant temperature region represented by reference numeral 189 corresponds to the start-up condition where the freezer load is not a part of the system. Advantageously, as represented by reference numeral 200, there is about 5% reduction in time to achieve the cold box temperature of about 255 K by using the sequential regulation and control of the temperature of the magneto-caloric elements of the cooling device 50.

The various aspects of the techniques described above find utility in a variety of cooling systems, such as refrigeration, air conditioning, electronics cooling, automotive cooling and so forth. These include air conditioners, water coolers, refrigerators, chillers, gas liquefaction plants, cryocoolers, magnetic bearing devices, rotating machines and so forth. The cooling devices as described above may be employed in refrigeration systems such as for household refrigeration and industrial refrigeration. In addition, such cooling devices may be employed for cryogenic refrigeration, such as for liquefied natural gas (LNG) or superconducting devices. Further, the cooling device may be employed in systems for ventilation and air conditioning. Examples of such systems include air conditioners and dehumidifiers.

As noted above, the method described here is advantageous in achieving a fast robust and efficient cold start-up of the cooling devices based upon magneto-caloric effect to meet the desired thermal management needs in the environments mentioned above. Further, the cold box cooling of the cooling device is initiated after the cold start-up of the device by maintaining the temperatures of the magneto-caloric elements substantially equal to the activation temperatures of the respective magneto-caloric element. Advantageously, the technique described above facilitates reduction of greenhouse gases due to relatively higher operational efficiency compared to a conventional vapor compression refrigeration technology. Furthermore, the magneto-caloric based cooling device described above also avoids use of environmentally non-friendly fluids like ammonia, chlorofluorocarbons etc and also operate with relatively less noise as compared to conventional cooling devices abased upon the vapor compression refrigeration technology.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
    controlling a temperature of the plurality of magneto-caloric elements to be substantially equal to an activation temperature of each respective magneto-caloric element, wherein said controlling includes:
        subjecting magneto-caloric elements in a first magneto-caloric block to a magnetic regenerative refrigeration cycle to regulate a temperature of magneto-caloric elements of a second magneto-caloric block, wherein said regulation includes selectively establishing thermal contact between the magneto-caloric elements of the first and second magneto-caloric block and one or both of a medium flow configured to transfer thermal energy to the magneto-caloric elements of the first magneto-caloric block and a medium flow configured to receive thermal energy from the magneto-caloric elements of the first magneto-caloric block;
    when the temperature of the magneto-caloric elements of the second magneto-caloric block is substantially equal to an activation temperature for the magneto-caloric elements of the second magneto-caloric block, and while subjecting the magneto-caloric elements in the first magneto-caloric block to the magnetic regenerative refrigeration cycle, subjecting the magneto-caloric elements in the second magneto-caloric block to a magnetic regenerative refrigeration cycle.

2. The method of claim 1, wherein the activation temperature of the magneto-caloric elements is determined based upon a Curie temperature of a respective magneto-caloric element, or a magneto-caloric effect curve of the respective magneto-caloric element, or intensity of an applied magnetic field, or combinations thereof.

3. The method of claim 1, further comprising regulating a temperature of magneto-caloric elements of a third magneto-caloric block via the magnetic regenerative refrigeration cycles of the magneto-caloric elements of the first and second magneto-caloric blocks only after initiation of the magnetic regenerative refrigeration cycles of the magneto-caloric elements of both the first and second magneto-caloric blocks.

4. The method of claim 1, further comprising:
    measuring a temperature of at least one of the magneto-caloric elements in the second magneto-caloric block;
    comparing the measured temperature of the at least one magneto-caloric element in the second magneto-caloric block with the activation temperature for each respective magneto-caloric element; and
    heating or cooling the at least one magneto-caloric element in the second magneto-caloric block by transferring heat through a fluid medium.

5. The method of claim 4, wherein the fluid medium comprises ethylene glycol, or water, or propylene glycol, or helium, or nitrogen, or dynalene, or combinations thereof.

6. The method of claim 1, wherein subjecting the magneto-caloric elements in the first magneto-caloric block to the magnetic regenerative refrigeration cycle comprises heating, or cooling the magneto-caloric elements through isentropic magnetization, or through isentropic demagnetization, and transferring heat from the magneto-caloric elements through the fluid medium.

7. The method of claim 1, wherein said selectively establishing thermal contact between the magneto-caloric elements of the first magneto-caloric block and one or both of a medium flow configured to transfer thermal energy to the magneto-caloric elements of the first magneto-caloric block and a medium flow configured to receive thermal energy from the magneto-caloric elements of the first magneto-caloric block includes selectively establishing thermal contact between the magneto-caloric elements of the first magneto-caloric block and one or both of a medium flow configured to transfer thermal energy to the magneto-caloric elements of the first magneto-caloric block and a medium flow configured to receive thermal energy from the magneto-caloric elements of the first magneto-caloric block based upon a measured temperature of the at least one magneto-caloric element and the activation temperature for the respective magneto-caloric element in the second magneto-caloric block.

8. A method comprising:
sequentially regulating a respective temperature of each of a plurality of thermally coupled magneto-caloric elements to be substantially equal to an activation temperature of the respective magneto-caloric element, wherein said sequentially regulating a respective temperature includes selectively establishing thermal contact between the respective magneto-caloric elements and one or both of a medium flow configured to transfer thermal energy to the magneto-caloric elements and a medium flow configured to receive thermal energy from the magneto-caloric elements;
when the respective temperature of each of the magneto-caloric elements is substantially equal to the activation temperature for that respective magneto-caloric element, subjecting that magneto-caloric element to a magnetic regenerative refrigeration cycle; and
simultaneously subjecting each of the magneto-caloric elements to a magnetic regenerative refrigeration cycle to maintain the respective temperature of each of the plurality of magneto-caloric elements at the temperature substantially equal to the activation temperature of the respective magneto-caloric element to facilitate cooling of an environment.

9. The method of claim 8, wherein sequentially regulating comprises:
selecting a first magneto-caloric block having one or more magneto-caloric elements, at least one of the magneto-caloric elements having a temperature substantially equal to the activation temperature of the respective element;
selecting a second magneto-caloric block having one or more magneto-caloric elements; and
subjecting the magneto-caloric elements in the first magneto-caloric block to a magnetic regenerative refrigeration cycle to regulate the temperature of the magneto-caloric elements of the second magneto-caloric block to be substantially equal to the activation temperature for each respective magneto-caloric element.

10. The method of claim 9, further comprising sequentially repeating the process of selecting the first and second magneto-caloric blocks and subjecting the first magneto-caloric block to the magnetic regenerative cycle for regulating temperatures of the plurality of magneto-caloric elements of the second magneto-caloric block to be substantially equal to the activation temperature for each respective magneto-caloric element.

11. The method of claim 8, wherein the activation temperature of each of the magneto-caloric elements is determined based upon a Curie temperature of the respective magneto-caloric element, or a magneto-caloric effect curve of the respective magneto-caloric element, or intensity of an applied magnetic field, or combinations thereof.

12. A cooling device, comprising:
a plurality of thermally coupled magneto-caloric elements configured to be selectively subjected to a magnetic regenerative refrigeration cycle and to provide cooling of an environment;
a control system configured to control a temperature of the plurality of magneto-caloric elements to be substantially equal to an activation temperature of each respective magneto-caloric element and to selectively subject the magneto-caloric elements to a magnetic regenerative refrigeration cycle;
one or more reservoirs containing a fluid medium; and
first and second heat exchangers thermally coupled to the plurality of magneto-caloric elements and at least one of the one or more reservoirs for transferring heat between the magneto-caloric elements and the environment through the fluid medium,
wherein the control system is configured to subject a first, but not a second or third, of the magneto-caloric elements to a magnetic regenerative refrigeration cycle so as to regulate the temperature of the first and a second, but not the third, of the magneto-caloric elements until the temperature of the second of the magneto-caloric elements is substantially equal to the activation temperature of the second of the magneto-caloric elements, and then to subject the first and second, but not the third, of the magneto-caloric elements to a magnetic regenerative refrigeration cycle so as to regulate the temperature of the first, second, and third of the magneto-caloric elements until the temperature of the third of the magneto-caloric elements is substantially equal to the activation temperature of the third of the magneto-caloric elements, and then to subject the first, second, and third of the magneto-caloric elements to a magnetic regenerative refrigeration cycle.

13. The cooling device of claim 12, wherein the control system is configured to sequentially regulate the temperature of each of the plurality of magneto-caloric elements to be substantially equal to the activation temperature of the respective magneto-caloric element during a start-up mode of operation.

14. The cooling device of claim 13, wherein the control system is configured to maintain the temperature of each of the plurality of magneto-caloric elements to be substantially equal to the activation temperature of the respective magneto-caloric element during a steady-state mode of operation.

15. The cooling device of claim 12, wherein the control system is configured to estimate the activation temperature of each of the plurality of magneto-caloric elements based upon a Curie temperature of the respective magneto-caloric element, or a magneto-caloric effect curve of the respective magneto-caloric element, or intensity of an applied magnetic field, or combinations thereof.

16. The cooling device of claim 15, further comprising a memory configured to store Curie temperatures, or magneto-caloric effect curves, or combinations thereof for each of the plurality of magneto-caloric elements for estimation of the activation temperature of each of the magneto-caloric elements.

17. The cooling device of claim 12, wherein said one or more reservoirs include first and second reservoirs containing a fluid medium.

18. The cooling device of claim 17, further comprising:
a plurality of temperature sensors configured to monitor temperature of at least one of the plurality of magneto-caloric elements; and
a plurality of bypass valves configured to selectively, via the control system, control flow of the fluid medium through the plurality of magneto-caloric elements based upon a measured temperature of the at least one of the plurality of magneto-caloric elements and the activation temperature of respective magneto-caloric element.

19. The cooling device of claim 12, further comprising a valve for coupling, or decoupling the environment from the plurality of magneto-caloric elements during a steady-state, or a start-up mode of operation.

20. The cooling device of claim 12, wherein the plurality of magneto-caloric elements comprise Gadolinium alloys, or lanthanum alloys, or manganese alloys, or samarium alloys, or cobalt alloys, or tin alloys, or combinations thereof.

21. The cooling device of claim 12, wherein the device is configured to provide cooling of a refrigeration system, or a chiller, or a gas liquefaction plant, or a cryocooler, or a magnetic bearing device, or an electronic device, or an automotive, or an air conditioning system, or a rotating machine, or combinations thereof.

22. A system, comprising:
at least one cooling device having a plurality of magneto-caloric elements subjected to a magnetic regenerative refrigeration cycle and configured to provide cooling of an environment;
a magnet configured to magnetize and demagnetize the plurality of magneto-caloric elements;
a control system configured to control a temperature of the plurality of magneto-caloric elements to be substantially equal to an activation temperature of each respective magneto-caloric element;
one or more reservoirs containing a fluid medium; and
first and second heat exchangers thermally coupled to the plurality of magneto-caloric elements and at least one of the one or more reservoirs for transferring heat between the magneto-caloric elements and the environment through the fluid medium,
wherein the control system is configured to sequentially regulate the temperature of each of the plurality of magneto-caloric elements to be substantially equal to the activation temperature of the respective magneto-caloric element, and to initiate, and then simultaneously maintain, the magnetic regenerative refrigeration cycle for each of the plurality of magneto-caloric elements after the temperature of each of the plurality of magneto-caloric elements is substantially equal to the activation temperature of the respective magneto-caloric element.

23. The system of claim 22, wherein the system comprises a refrigeration system, or a chiller, or a gas liquefaction plant, or a cryocooler, or a magnetic bearing device, or an electronic device, or an automotive, or an air conditioning system, or a rotating machine, or combinations thereof.

24. The system of claim 22, wherein the control system is configured to sequentially regulate the temperature of the plurality of magneto-caloric elements to be substantially equal to the activation temperature of each respective magneto-caloric element during a start-up mode of operation.

25. The system of claim 22, wherein the control system is configured to maintain the temperature of the plurality of magneto-caloric elements to be substantially equal to the activation temperature of each respective magneto-caloric element during a steady-state mode of operation.

26. The system of claim 22, wherein the control system is configured to estimate the activation temperature of each of the plurality of magneto-caloric elements based upon a Curie temperature of the respective magneto-caloric element, or a magneto-caloric effect curve of the respective magneto-caloric element, or intensity of an applied magnetic field, or combinations thereof.

27. The system of claim 22, wherein said one or more reservoirs includes first and second reservoirs having a fluid medium.

28. The system of claim 27, further comprising:
a plurality of temperature sensors configured to monitor temperature of at least one of the magneto-caloric elements; and
a plurality of bypass valves configured to selectively, via the control system, control flow of the fluid medium through the plurality of magneto-caloric elements based upon a measured temperature of the at least one of the plurality of magneto-caloric elements and the activation temperature of respective magneto-caloric element.

* * * * *